US012291901B2

(12) United States Patent
Mensch et al.

(10) Patent No.: US 12,291,901 B2
(45) Date of Patent: May 6, 2025

(54) VEHICLE WITH AN UNLOCKING MECHANISM, LOCKING MECHANISM, AND/OR OPENING MECHANISM FOR AN ELECTRONIC LOCK

(71) Applicant: Witte Automotive GmbH, Velbert (DE)

(72) Inventors: Reinaldo Mensch, Wuppertal (DE); Ralf Höhn, Velbert (DE); Karsten Steinhauer, Essen (DE)

(73) Assignee: Witte Automotive GmbH, Velbert (DE)

( * ) Notice: Subject to any disclaimer, the term of this patent is extended or adjusted under 35 U.S.C. 154(b) by 97 days.

(21) Appl. No.: 18/056,017

(22) Filed: Nov. 16, 2022

(65) Prior Publication Data

US 2023/0151650 A1 May 18, 2023

(30) Foreign Application Priority Data

Nov. 16, 2021 (DE) ..................... 10 2021 212 862.9
Oct. 27, 2022 (DE) ..................... 10 2022 211 428.0

(51) Int. Cl.
*E05B 81/76* (2014.01)
*E05B 81/78* (2014.01)

(52) U.S. Cl.
CPC .............. *E05B 81/77* (2013.01); *E05B 81/78* (2013.01)

(58) Field of Classification Search
None
See application file for complete search history.

(56) References Cited

U.S. PATENT DOCUMENTS 9,637,088 B2 * 5/2017 Ette .......................... G06F 3/017
11,131,117 B2 * 9/2021 Shah ...................... H03K 17/94
11,136,000 B2 * 10/2021 Cumbo ............... B60R 25/2045
11,382,208 B2 * 7/2022 Sieg ....................... B60R 25/246
2013/0200995 A1 * 8/2013 Muramatsu ............ G06V 40/28 340/5.51
2015/0254913 A1 * 9/2015 Obata ...................... G07C 9/30 340/5.72
2016/0096509 A1 * 4/2016 Ette ........................ G06V 40/20 382/103
2017/0335606 A1 * 11/2017 Schatz ................ G06F 3/03547
2018/0209182 A1 7/2018 Beck et al.
2019/0024421 A1 * 1/2019 Cumbo ................ B60Q 1/0011
2019/0152433 A1 * 5/2019 Cumbo .............. G07C 9/00714
(Continued)

FOREIGN PATENT DOCUMENTS

CN 101970782 A 2/2011
CN 109312577 A 2/2019
(Continued)

*Primary Examiner* — Carlos Garcia
(74) *Attorney, Agent, or Firm* — Marshall & Melhorn, LLC

(57) ABSTRACT

A vehicle may have an unlocking mechanism and/or locking mechanism and/or opening mechanism for an electric vehicle lock where at least one contactless, triggering device for actuating the unlocking mechanism, locking mechanism, and/or opening mechanism, and a status indicator of the unlocking mechanism, locking mechanism, and/or opening mechanism, are provided. The triggering device is non-visibly arranged on a vehicle panel and/or on a body section, and the status indicator is arranged in an outwardly visible region of the vehicle, such as in a channel strip element.

21 Claims, 1 Drawing Sheet

(56) References Cited

U.S. PATENT DOCUMENTS

| | | | | |
|---|---|---|---|---|
| 2020/0086881 | A1* | 3/2020 | Abendroth | G10L 17/00 |
| 2020/0282950 | A1 | 9/2020 | Shimizu et al. | |
| 2020/0291676 | A1* | 9/2020 | Shah | G07C 9/00563 |
| 2021/0160998 | A1* | 5/2021 | Sieg | B60R 25/246 |
| 2022/0017043 | A1* | 1/2022 | Breynaert | B60R 25/01 |

FOREIGN PATENT DOCUMENTS

| | | | |
|---|---|---|---|
| DE | 102014107809 | A1 | 12/2015 |
| DE | 102014220042 | A1 | 4/2016 |
| DE | 102017208368 | A1 | 11/2017 |
| DE | 102016122550 | A1 | 5/2018 |
| DE | 102017120393 | A1 | 3/2019 |
| DE | 102018128539 | A1 | 6/2019 |
| DE | 102020106494 | A1 | 9/2020 |

* cited by examiner

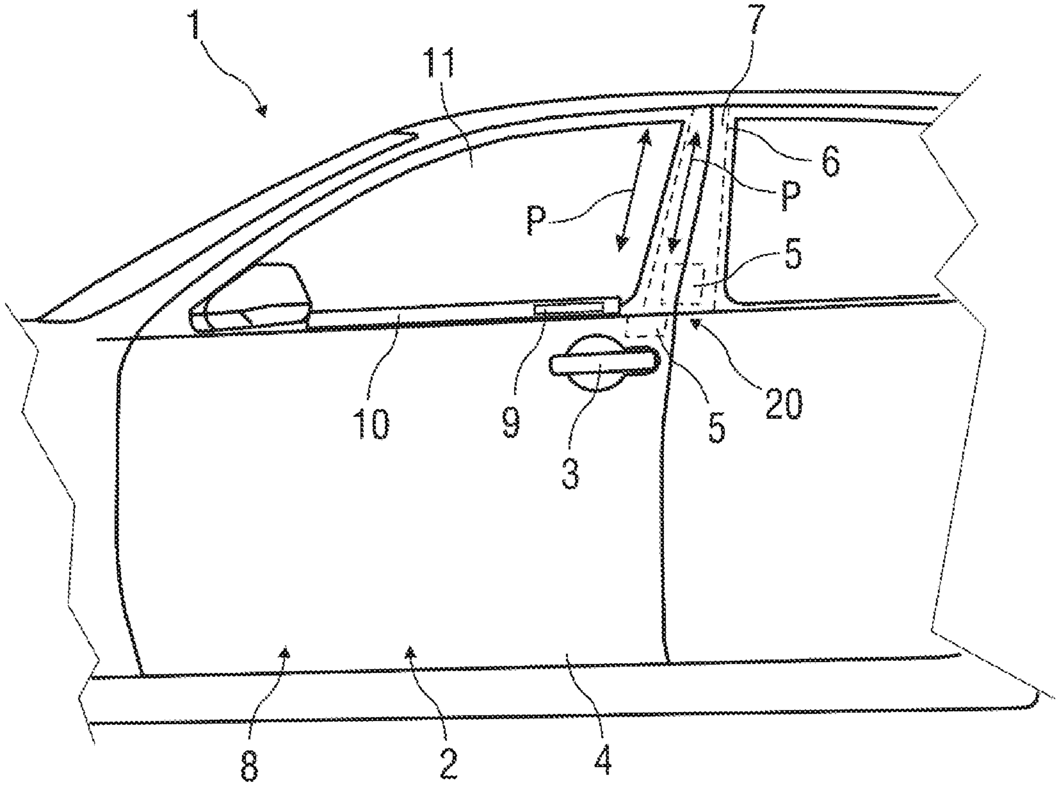
1
11
7
6
P
P
5
10
9
3
5
20
8
2
4

VEHICLE WITH AN UNLOCKING MECHANISM, LOCKING MECHANISM, AND/OR OPENING MECHANISM FOR AN ELECTRONIC LOCK

FIELD

The invention relates to a vehicle having an unlocking mechanism and/or locking mechanism and/or opening mechanism for an electronic lock, in particular a vehicle lock.

BACKGROUND

Door unlocking mechanisms and/or door opening mechanisms are known, for example given motor vehicles, in which a vehicle lock of a vehicle door is unlocked electrically.

For example, in this regard DE 10 2014 107 809 A1 discloses a door handle, in particular an exterior door handle of a motor vehicle, having a sensor that comprises a first metal surface arranged in the interior of the door handle and a second metal surface arranged at a distance therefrom, which second metal surface can be bent in the direction of the first metal surface, as well as a detection apparatus by means of which a change in capacitance or inductance caused by the change in the distance between the metal surfaces can be detected.

Further access systems for a vehicle are known, for example, from DE 10 2017 120 393 A1, DE 10 2016 122 550 A1 or US 2018/0209182 A1.

SUMMARY

The invention is based on the object of specifying a vehicle comprising an unlocking mechanism and/or locking mechanism and/or opening mechanism, in particular for an electric vehicle lock, which is improved compared to the prior art.

The object is achieved according to the invention with the features specified in the claims.

The object is achieved according to the invention by a vehicle which comprises an unlocking mechanism and/or locking mechanism and/or opening mechanism for an electric vehicle lock, wherein at least one, in particular contactless, triggering device for actuating the unlocking mechanism, locking mechanism, and/or opening mechanism, and a status indicator of the unlocking mechanism, locking mechanism, and/or opening mechanism, are provided; wherein the triggering device is non-visibly arranged on a vehicle panel, in particular a door panel and/or a luggage compartment lid and/or a trunk lid, and/or on a body section, in particular on or in a paneling element of a B-pillar or C-pillar, and the status indicator is arranged in an outwardly visible region of the vehicle, in particular in a channel strip element, for example a channel strip engagement. The channel strip element can be designed as a handle which can be gripped by the user. A door handle can thereby be omitted, and/or the channel strip element, in particular the channel strip handle, forms an additional grip point for opening the vehicle door. The status indicator can also be arranged on a body section and/or on or in a paneling element of an A-pillar and/or B-pillar.

The triggering device is configured to detect and execute a contactless actuation for locking, unlocking, and/or opening the vehicle lock. For example, the triggering device is designed to actuate an unlocking mechanism, locking mechanism, and/or opening mechanism of the electronic vehicle lock by means of identified gesture control or touch control, and to automatically lock, unlock, and/or open the electronic vehicle lock.

The triggering device is configured to unlock and/or open the electric vehicle lock upon a detected approach and/or movement and/or gesture in a region of or very close to the status indicator and/or the channel strip element.

The triggering device can be configured to unlock and/or open the electric vehicle lock upon a detected approach and/or movement and/or gesture in a region of and/or in the direction of a stationary exterior door handle. A stationary door handle can, for example, be formed by a planar exterior vehicle skin and a recessed handle arranged thereunder. A stationary door handle can also have an external appearance of a door handle protruding from the exterior vehicle skin.

The advantages achieved with the invention are, in particular, that a vehicle with such a locking mechanism, unlocking mechanism, and/or opening mechanism can be furnished without a handle by means of a gesture detection and/or touch detection and integrated in a vehicle panel or a body section. In order to implement the access to the vehicle in a stepwise and secure manner, an access authorization for the vehicle can first be verified depending on the status, and then the vehicle, in particular the electronic vehicle lock, can be automatically unlocked and possibly subsequently opened automatically, or, given an open door that was closed, the access authorization to the vehicle can first be verified and then the vehicle, in particular the electronic vehicle lock, can be locked. Door handles, in particular exterior door handles, can thus be omitted.

The triggering device enables a simple, intuitive operation of the locking mechanism, unlocking mechanism, and/or opening mechanism. The triggering device and the status indicator can be used in small installation spaces. Vehicles can also be simply retrofitted with the triggering device and status indicator according to the invention. The status indicator enables a visual feedback to the user.

The status indicator can have at least one lighting unit. Different feedback can be output via different colors and/or color profiles.

The triggering device can also have at least one touch sensor and a touch function for actuating the locking mechanism. To actuate the unlocking mechanism and/or the opening mechanism, the triggering device can be actuatable in a contactless manner.

The triggering device can be configured to detect a first actuation and then a second actuation. For example, a first approach and/or movement and/or gesture in the region of, in the direction of, or very close to the triggering device can be detected as a first actuation. A second approach and/or movement and/or gesture in the region of, in the direction of, or very close to the status indicator and/or the channel strip element can be detected as a second actuation.

The triggering device can be configured to unlock the vehicle lock upon a first detection of a first approach and/or movement and/or gesture in the region of the triggering device. The triggering device can be configured to open the vehicle lock upon a second detection of a second approach and/or movement and/or gesture in the region of, in the direction of, or very close to the status indicator and/or the channel strip element and/or the stationary exterior door handle.

The triggering device can have at least one detection module which is arranged at least in sections in the region of the status indicator and/or the channel strip element and/or the stationary exterior door handle, for example in the region below a window. For example, the detection module extends over a region of the vehicle panel, of the body section, and/or of a paneling element of the vehicle, for example a B-pillar, and over a region of the channel strip element and/or of the status indicator and/or of the fixed door handle. Alternatively or additionally, the detection module extends below a window of the vehicle.

The triggering device and/or the detection module may, for example, have a gesture module. Alternatively or additionally, the triggering device and/or the detection module may also comprise a touch module. The gesture module may comprise sensors for gesture detection and algorithms for gesture triggering for locking, unlocking, and/or opening the vehicle lock. The touch module may comprise sensors for touch detection and algorithms for touch triggering for locking, unlocking, and/or opening the vehicle lock.

Moreover, a vehicle authentication system may be coupled to the triggering device and the vehicle lock in order to additionally verify—in the event of a locking signal, unlocking signal, or opening signal triggered by an identified gesture or movement of a user—whether the user is also authorized to lock, unlock, or open the vehicle lock.

In particular, after the first actuation, in particular triggering, the triggering device may be in a deployment mode. In the deployment mode, the second actuation, in particular triggering, can be detected and evaluated. As soon as the hand of the user is located in or very close to the status indicator and/or the channel strip element and/or the exterior door handle, and/or moves in the direction of the status indicator and/or the channel strip element and/or the exterior door handle, the electronic vehicle lock, in particular the electronic door lock, is unlocked and/or opened.

The detection module may comprise, for example, at least one first sensor unit in a first, for example upper, region of the vehicle panel and/or body section. The detection module may comprise, for example, at least one further, second sensor unit in a second, for example lower, region of the vehicle panel and/or body section, and/or in the region of the status indicator and/or of the channel strip element.

The respective sensor can be designed as an inductive sensor or a capacitive sensor for gesture detection and/or touch detection. The sensor(s) can be integrated as a sensor field or a sensor pad in or on the vehicle panel or on a body section, in particular on or in a paneling element of the body section, for example a B-pillar or C-pillar.

The triggering device can have a number or a plurality of sensors which are arranged vertically behind the vehicle panel and/or body section and/or the paneling element. For example, the sensors and/or the sensor surfaces or sensor pads can be arranged vertically one above the other. An executed movement and a gesture in the vertical direction of the vehicle can thereby be detected and evaluated in a simple manner.

The triggering device can be configured to detect at least one vertical movement as a locking request, unlocking request, and/or opening request.

For example, a movement of the hand of a user from top to bottom is detected by means of the sensors. Such a movement can be a hand movement, for example from a region above the channel strip element and/or in the region of a window and/or the body section in the direction of a region below the channel strip element and/or below the window and/or the body section. A movement which, for example, is performed from above, for example from a window region or the body section downward, in particular in the direction of the exterior door handle, can be detected by means of the sensors, and the electronic vehicle lock, in particular an electronic door lock, can be unlocked. As soon as the hand of the user is located in or very close to the status indicator and/or the channel strip element, the electronic vehicle lock, in particular the electronic door lock, is unlocked and/or opened.

If, instead of the movement from top to bottom, given a closed vehicle door a reverse movement from the bottom upward is executed by the hand of the user, for example, and/or the triggering device is touched, the electronic vehicle lock, in particular the electronic door lock, is automatically locked by means of the algorithm of the gesture module and/or of the contact module.

For example, the vehicle lock can be unlocked in a first direction by means of a movement and/or gesture detected by means of the triggering device. By detecting a movement and/or gesture in a second direction opposite the first direction, the vehicle lock can be locked. To open the vehicle lock, wherein the vehicle door is, for example, additionally moved in the direction of the user, a further movement and/or gesture in the first direction and/or in the direction of the status indicator, the channel strip element, and/or the exterior door handle can be detected. For example, a detection region of the triggering device extends in the vertical direction. For example, a first, upper detection region is arranged on a vehicle panel and/or on a body section. A second detection region is, for example, arranged below and, optionally additionally offset in the longitudinal direction in relation to, the first detection region. The second detection region extends, for example, in the region of the channel strip element, of a body section, and/or of a paneling element. A large area can thereby be covered for detecting a movement and/or gesture.

Preferably, the vehicle can additionally comprise a status indicator which is integrated in the vehicle panel in an outwardly visible manner.

The status indicator can be configured to indicate a current status and/or a status change of the triggering device and/or of the locking mechanism, unlocking mechanism, and/or opening mechanism of the electronic vehicle lock. The status indicator can output at least one optical and/or an acoustic and/or haptic feedback.

The status indicator and the triggering device are coupled to one another in terms of signaling.

DESCRIPTION OF THE FIGURES

Exemplary embodiments of the invention are explained in greater detail using a drawing. The single FIGURE thereby shows a vehicle door 2 as a side region of a vehicle 1. The other parts of the vehicle 1 are cut away.

DETAILED DESCRIPTION

In the shown exemplary embodiment, the vehicle 1 comprises an exterior door handle 3. This can be eliminated by using the invention described here. However, it may also continue to be provided.

Given conventional vehicle doors 2 or tailgates or engine hoods of a vehicle 1, the exterior door handle 3 or another suitable handle element is provided with or without a keyhole for a key for conventional locking and unlocking of a mechanically actuatable lock mechanism (not shown) which is secured within the vehicle door 2. After manual unlocking of an associated door lock or vehicle lock (not shown) has taken place, a movement of the exterior door handle 3 then has the effect that the vehicle door 2 can be moved relative to a vehicle body and opened.

The invention enables, in a simple manner, an intuitive solution for unlocking, opening, and locking vehicles 1 if today's conventional handle arrangement is omitted. In particular, fixed elements on the outside of a door panel 4 and the vehicle panels can be omitted.

For this purpose, the invention provides that, instead of fixed exterior door handles 3 or in addition to them, a triggering device 5 can be arranged on a body section 6, for example on or in a paneling element 7 of a B-pillar or C-pillar, in particular in a trim strip or cover of the B-pillar or C-pillar. Alternatively, the triggering device 5 can be arranged on the door panel 4 and can be oversprayed with a coating layer 8.

In addition, a status indicator 9 is provided which displays, in an outwardly visible region of the vehicle 1, a current status and/or a status change of the triggering device 5 and/or of a locking mechanism, unlocking mechanism, and/or opening mechanism of the electronic vehicle lock, in particular of the electronic door lock. An electronic vehicle lock is in particular understood to mean an electronic locking system of the vehicle 1 and/or electronic locks of movable vehicle elements, such as doors etc.

For this purpose, the status indicator 9 and the triggering device 5 are coupled in terms of signaling in a manner not shown in detail. For example, the status indicator 9 can be arranged in a channel strip element 10, for example a channel strip engagement, of the vehicle door 2, or at another suitable location of the vehicle door 2.

The triggering device 5 can be configured to detect and execute a contactless actuation for automatically triggering and actuating the locking mechanism, unlocking mechanism, and opening mechanism for locking, unlocking, and/or opening the electronic vehicle lock. For example, the triggering device 5 can automatically lock, unlock, and/or open the vehicle lock by means of a gesture control or touch control according to arrows P.

For this purpose, the triggering device 5 may comprise, for example, a gesture module and/or a touch module. The gesture module may comprise sensors for gesture detection and algorithms for gesture triggering for locking, unlocking, and/or opening the vehicle lock. The touch module may comprise sensors for touch detection and algorithms for touch triggering for locking, unlocking, and/or opening the vehicle lock.

The triggering device 5 comprises at least one detection module 20 for detecting an actuation in front of and/or on the triggering device 5. The detection module 20 is arranged in the region of the status indicator 9 and/or the channel strip element 10 and/or the stationary exterior door handle 3, for example in the region below a window.

The detection module 20 is arranged at least in sections in the region of the status indicator 9 and/or of the channel strip element 10 and/or of the stationary exterior door handle 3. The detection module 20 comprises, for example, the gesture module and/or the touch module. For example, the detection module 20 extends over a region of the vehicle panel, of the body section 6, and/or of the paneling element 7, and over a region of the channel strip element 10 and/or of the status indicator 9 and/or of the fixed door handle 3. Alternatively or additionally, the detection module 20 extends below a window region 11 of the vehicle 1. In particular, detection regions of the detection module 20 extend in the vertical direction of the vehicle 1. A gesture and/or movement of the hand of the user in the vertical direction can thereby be detected in a simple manner.

For example, by means of the sensors, a movement with the hand of a user—which executes, for example, a movement from an upper region, in particular from a window region 11 or from the body section 6, downward, in particular in the direction of the exterior door handle 3—is detected, and the electronic vehicle lock, in particular an electronic door lock, is unlocked. As soon as the hand of the user is located in or very close to the status indicator 9 and/or the channel strip element 10, the electronic vehicle lock, in particular the electronic door lock, is unlocked and/or opened.

If, for example, instead of the movement from top to bottom, a reverse movement by the user's hand is executed from bottom to top when the vehicle door 2 is closed, the electronic vehicle lock, in particular the electronic door lock, is automatically locked by means of the algorithm of the gesture module.

In other words, The gesture module detects simple swiping movements of a user from top to bottom and vice versa as trigger signals for the algorithms for automatically unlocking, locking, and opening the electronic vehicle lock.

A capacitive sensor or an inductive sensor can be used as a sensor. In particular, it is a sensor field or a sensor pad. Individual sensors, in particular sensor electrodes, can thereby be arranged one after or below another or interleaved, so that they are activated in a specific sequence and generate a corresponding trigger signal for unlocking, locking, and/or opening the electronic vehicle lock, in particular the electronic door lock.

Moreover, a vehicle authentication system (not shown) can be coupled to the triggering device 5 and the vehicle lock in order—in the event of a locking signal, unlocking signal, or opening signal triggered due to an identified gesture or movement of a user—to additionally verify whether the user is also authorized to lock, unlock, or open the vehicle lock.

The triggering device 5, in particular the sensor field or sensor pad, for example capacitive sensor surfaces, can moreover be arranged in the body section 6 or in the paneling element 7 or on the door panel 4 in such a way that, given a vehicle door 2, the sensors detect when the user grasps the existing exterior door handle 3 in order to automatically unlock the electronic vehicle lock and automatically open it. This is realized in that the sensors are arranged directly above the exterior door handle 3 and detect and analyze the movement in the direction of the exterior door handle 3. For this purpose, the sensors of the triggering device 5 can be arranged vertically at greater distances behind the paneling element 7, or be integrated into this paneling element 7 or into the door panel 4.

Preferably, the vertical movement from top to bottom is detected as an unlocking request and opening request, and a movement from bottom to top is detected as a locking request and closing request.

The capacitive sensors are additionally executed and diagnosed in such a way that, as environmental electrodes, they also filter environmental influences and thus avoid undesired behavior of the locking mechanism, unlocking mechanism, and opening mechanism of the electronic vehicle lock.

The invention enables a simple, intuitive operation by gesture control, in particular simple swiping movements. Sensors can thereby be used for detecting the gesture for unlocking, locking, opening, and closing the electronic vehicle lock. The triggering device 5 requires a small installation space. By means of the status indicator 9, the user receives visual feedback as to whether the electronic vehicle lock is locked, unlocked, open, or closed.

The triggering device 5 can thereby also combine the gesture module with a contact module, for example in order to separate the different functions of locking, unlocking, opening, and closing from one another.

LIST OF REFERENCE SIGNS

1 vehicle
2 vehicle door
3 exterior door handle
4 door panel
5 triggering device
6 body section
7 paneling element
8 coating layer
9 status indicator
10 channel strip element
11 window region
20 detection module
P arrow

What is claimed is:

1. A vehicle, which comprises an unlocking mechanism for an electric vehicle lock, wherein at least one contactless, triggering device for actuating the unlocking mechanism and a status indicator of the unlocking mechanism are provided, wherein the triggering device is non-visibly arranged on a vehicle panel and/or on a body section, and the status indicator is arranged in an outwardly visible region of the vehicle in a channel strip element, in a body section, and/or in a paneling element, wherein the triggering device comprises a first detection region and is configured to unlock the vehicle lock upon a first detection of a first approach and/or gesture in the first detection region of the triggering device, and the triggering device comprises a second detection region to open the vehicle lock upon a second detection of a second approach and/or gesture in the region of, in the direction of, or very close to the status indicator and/or the channel strip element and/or a stationary exterior door handle, wherein the first detection region comprises a number of capacitive sensors that are arranged vertically behind the vehicle panel and/or the body section, wherein the status indicator is arranged separately from the triggering device and perpendicularly to the triggering device.

2. The vehicle according to claim 1, wherein the triggering device comprises the number of capacitive sensors which are arranged between the vehicle panel and/or the body section, on which the triggering device is arranged, and the channel strip element and/or the exterior door handle.

3. The vehicle according to claim 1, wherein the triggering device is configured to detect at least one vertical movement as the locking request, unlocking request, and/or opening request.

4. The vehicle according to claim 1, wherein the status indicator is configured to indicate a current status and/or a status change of the triggering device and/or of the locking mechanism, unlocking mechanism, and/or opening mechanism of the electronic vehicle lock.

5. The vehicle according to claim 1, wherein the status indicator and the triggering device are coupled to one another in terms of signaling.

6. The vehicle according to claim 1, wherein a vehicle authentication system is coupled to the triggering device and the vehicle lock, in order, in the event of a locking signal, unlocking signal, or opening signal triggered due to an identified gesture and/or movement of a user, to additionally verify whether the user is also authorized to lock, unlock, or open the vehicle lock.

7. The vehicle according to claim 1, wherein the vehicle lock is opened by a further movement and/or gesture detected by triggering device in a first direction and/or in the direction of the status indicator, the channel strip element, and/or the exterior door handle.

8. The vehicle according to claim 1, wherein the status indicator extends horizontally in an area of the channel strip element.

9. The vehicle according to claim 1, wherein the status indicator extends horizontally in an area of the body section.

10. The vehicle according to claim 1, wherein the status indicator extends horizontally in an area of the paneling element.

11. The vehicle according to claim 1, wherein the second detection region is different from the first detection region.

12. The vehicle according to claim 1, wherein the status indicator is arranged separately from the triggering device and on another vehicle part than the triggering device.

13. The vehicle according to claim 1, wherein the status indicator is arranged below the second detection region.

14. The vehicle according to claim 1, wherein the status indicator is arranged close to a handle element.

15. The vehicle according to claim 1, wherein the status indicator extends over a length in a longitudinal direction of a handle element.

16. The vehicle according to claim 1, wherein the status indicator is arranged on the channel strip element which is formed as a handle.

17. The vehicle according to claim 1, wherein the triggering device has at least one detection module which is arranged in the region of the status indicator and/or of the channel strip element and/or of the stationary exterior door handle.

18. The vehicle according to claim 17, wherein the detection module comprises at least one gesture module and/or one touch module.

19. The vehicle according to claim 1, wherein the first detection region of the triggering device extends in the vertical direction of the vehicle.

20. The vehicle according to claim 19, wherein the second detection region of the triggering device extends below the first detection region.

21. The vehicle according to claim 20, wherein the second detection region is formed offset in the longitudinal direction relative to the first detection region.

* * * * *